United States Patent [19]

Igwe

[11] Patent Number: 5,973,013
[45] Date of Patent: Oct. 26, 1999

[54] POLYAMIDE/POLYURETHANE MICRO-BLEND AND PROCESS

[75] Inventor: Godwin Joseph Igwe, Newark, Del.

[73] Assignee: E. I. du Pont de Nemours and Company, Wilmington, Del.

[21] Appl. No.: 08/989,909

[22] Filed: Dec. 12, 1997

Related U.S. Application Data

[60] Provisional application No. 60/056,977, Aug. 26, 1997.

[51] Int. Cl.$^6$ ...................................... C08J 11/06
[52] U.S. Cl. ........................... 521/49; 521/49.8; 525/424
[58] Field of Search ........................... 525/424; 521/49.8, 521/49

[56] References Cited

U.S. PATENT DOCUMENTS

| | | | |
|---|---|---|---|
| 4,174,358 | 11/1979 | Epstein | 525/183 |
| 4,369,285 | 1/1983 | Sanderson | 525/424 |
| 5,585,152 | 12/1996 | Tamara | 525/424 |

FOREIGN PATENT DOCUMENTS

| | | | |
|---|---|---|---|
| 0 023 667 | 2/1981 | European Pat. Off. | C08L 77/00 |
| 0 492 245 | 7/1992 | European Pat. Off. | C08L 77/00 |
| 0 757 078 | 2/1997 | European Pat. Off. | C08L 59/00 |
| 105974 | 5/1974 | Germany | D01D 1/00 |
| 35 45 033 | 7/1986 | Germany | C08L 77/00 |
| 298 253 | 2/1992 | Germany | C08L 77/02 |

OTHER PUBLICATIONS

C. Franke et al., Wirkung von Diisocyanat als reaktiver Koppler in TPU/PA6–Blends, *Die Angewandte Makromolekulare Chemie*, 206,21–38, 1993.

C. Franke et al., Applied Macromolecular Chemistry, *Angew. Makromol. Chem.*, 206,21–38, 1993.

*Primary Examiner*—Patricia A. Short

[57] ABSTRACT

Disclosed is a process for melt blending a mixture of a thermoplastic polyamide and segmented thermoplastic copolymers of polyurethane and the product thereof. The process of the invention is useful for recycling textile goods, such as pantyhose, into a form useful for fabricating into shaped articles such as moldings, sheets, and fibers.

12 Claims, No Drawings

POLYAMIDE/POLYURETHANE MICRO-BLEND AND PROCESS

This application claims the benefit of U.S. Provisional Application No. 60/056,977, filed Aug. 26, 1997.

FIELD OF THE INVENTION

This invention relates to a process for melt blending a mixture of a thermoplastic polyamide, for example nylon 6,6, and segmented thermoplastic copolymers of polyurethane and the product thereof. The process of the invention is useful for recycling textile goods such as pantyhose into a form useful for fabricating into shaped articles such as moldings, sheets, and fibers.

BACKGROUND OF THE INVENTION

The term "spandex" is employed in the art to describe a long chain synthetic fiber comprised of at least 85% by weight of a segmented polyurethane. The segmented polyurethane is composed of soft segments and hard segments. The soft segments can be polyether-based portions of the polymer chain, such as are derived e.g. from poly (tetramethylene ether)glycol. The hard segments can be derived from the reaction of an organic diisocyante, such as methylene-bis-(4-phenylisocyanate) with a diamine chain extender.

Spandex fiber has long been known in the art to impart desirable elasticity to textile goods. In many uses, spandex fibers are employed in combination with other textile fibers, notably nylon 6,6, in order to achieve some particular combination of aesthetic, comfort, and economic goals. Such combinations are achieved by combining fibers of spandex with fibers of nylon 6,6 during the textile fabrication process. One particular textile end-use is in pantyhose. Unlike many textile goods, pantyhose have very limited lifetime, and are discarded frequently, creating a significant waste stream. Until the development of the present invention there was no means for recycling that waste stream in an economical way.

While chemical separation of the spandex from the nylon was known, it was not cost-effective. Clearly the best approach was to shred the pantyhose and melt extrude the polymer into pellets or new fibers. However, spandex polymer exhibits considerable degradation when extruded at the temperatures of ca. 265° C. or greater normally required for extrusion of nylon 6,6.

Michels et al., GDR 105974, disclose a process for extruding polymer melts consisting of two or more components which do not react chemically with one another and do not form a microscopically homogeneous solution. However, only blends of polyethylene terephthalate and polyethylene are disclosed. Extrusion temperature was 270° C.

Franke et al., Angew. Makromol. Chem. 206, 21ff(1993), disclose the extrusion of blends of polyamide 6 with thermoplastic polyurethanes comprising at least 78% of thermoplastic polyurethanes. Extrusion was accomplished using a twin screw extruder with a melt temperature of ca. 230° C.

SUMMARY OF THE INVENTION

The present invention provides for a process for forming a polymer composition, the process comprising feeding a mixture of a thermoplastic polyamide and up to 20% by weight of a thermoplastic segmented polyurethane, said segmented polyurethane having soft segments and hard segments, to a melt mixing device, melting said mixture therein, and discharging the mixture so formed, the temperature of the melt being maintained substantially in the range of 240–260° C. during the mixing process. In a preferred embodiment the percent of thermoplastic segmented polyurethane present is 5% to 20%.

The present invention further provides for the polymer composition produced by the process of the invention.

The present invention still further provides for a process for molding the product of the invention, and for the fabricated articles made thereby.

The present invention still further provides for a process for melt spinning the product of the invention, and for the fibers spun therefrom.

DETAILED DESCRIPTION OF THE INVENTION

The nylon 6,6 suitable for the practice of the invention is a so-called textile grade of nylon having a relative viscosity, RV, of at least 20, preferably at least 50 and most preferably 50–60, as determined by ASTM D789.

The thermoplastic segmented polyurethane suitable for the practice of the invention have soft-segments comprising polyethers having number average molecular weight in the range of 1750–2250. Preferred such polyethers include those derived from tetramethylene glycol, 3-methyl-1,5-pentane diol, tetrahydrofuran(THF), 3-methyltetrahydrofuran, and copolymers thereof. Most preferred is polytetramethylene ether glycol.

The thermoplastic segmented polyurethane suitable for the practice of the invention have hard segments derived from the reaction of an organic diisocyanate with a diamine chain extender. Preferred diisocyanate is methylene-bis-(4-phenylisocyanate). Preferred chain extenders include ethylene diamine, 1,3-cylcohexane diamine, 1,4-cyclohexane diamine, 1,3-propylene diamine, 2-methylpentamethylene diamine, 1,2-propylene diamine, 1,2-diamino ethane, and mixtures thereof.

Most preferred for the polyurethane of the invention is a polyurethane of the composition: poly(tetramethylene ether) glycol with a number average molecular weight of 1800/ methylene bis (4-phenyl isocyanate)/ethylene diamine mixed with 2-methyl-1,5-diaminopentane in a 90/10 molar ratio.

The polymer mixture suitable for the practice of the present invention may include such other components as antioxidants, processing aids, compatibilizers and plasticizers as are in common use in the art., the total amount of such additives not to exceed 10% by weight, preferably less than 5%. The mixture may also include up to 5%, preferably up to 2%, cellulose or other polymers.

In the process of the invention, the unmelted polymers in the form of flakes, pellets, powders, or fibers are preferably mixed in the solid state prior to melt blending. The polyurethane component comprises no more than 20% by weight of the total mixture. In one embodiment, the polymers are fed to a screw extruder known in the art wherein the mixture is melted and blended to form a macroscopically homogeneous melt which is then extruded through an aperture and cooled and solidified. The extruder employed in the process of the invention may be a single screw or twin screw extruder, preferably a twin screw.

In another embodiment, the polymers are fed to a batch mixer wherein the mixture is melted and blended to form a macroscopically homogeneous melt which is then removed from the batch mixer by means known in the art.

In a preferred embodiment of the invention, the material being melt blended is pantyhose. In general the pantyhose need not be shredded prior to melt blending, particularly when melt blending is performed in a batch mixer.

However, the pantyhose is preferably shredded prior to melt blending, and in the preferred embodiment wherein a twin-screw extruder is employed to perform the melt blending operation, shredding the pantyhose prior to melt blending is highly preferred. Suitable shredders and cutters are widely available commercially. One of skill in the art will recognize that one shredder design may be superior to another for the task of shredding pantyhose. However, it has been found in the practice of the invention that general-purpose shredders are satisfactory.

Polyamides are known in the art to be susceptible to hydrolysis at extrusion temperatures. Therefore it is highly preferred that the polymers, in form of fiber, pellet, or otherwise, be dried prior to melt processing. Drying may be conveniently achieved at temperatures in the range of 50° C.–120° C. for 28–48 hours. Numerous drying ovens known in the art are suitable for this purpose.

In the process of the invention, the melt temperature is held substantially in the range of 240–260° C during melt blending. One of average skill in the art will understand that it would not be unusual for there to occur brief excursions in melt temperature either above or below the range of 240–260° C. However, the temperature of the melt should be controlled to provide melt temperature substantially in the range of 240–260° C.

When an extruder is employed for the process of the invention melt temperature is conveniently determined at the tips of the extruder screws employing a thermocouple probe extending through the extruder barrel into the melt. Alternatively, the melt temperature may be determined by inserting a thermocouple into the melt as it exits the die, or by IR sensing of the melt temperature at the exit of the die.

When a batch mixer is employed for the process of the invention, melt temperature is conveniently determined by employing a thermocouple extending into the melt.

The temperature range of 240–260° C. may be maintained by any combination of techniques known in the art for the particular mixing apparatus employed. For example, in a screw-type extruder, adjustments may be made in screw speed, barrel or die temperature, feed rate, and composition by incorporation of processing aids as hereinabove provided for.

It is found in the practice of the invention, that when the melt temperature exceeds 260° C, conspicuous degradation of the polyurethane component of the mixture begins to occur, causing the extruded strand to become inhomogeneous and bubbly. Occasionally liquid degradation products and smoke are also observed to exit the die. If the temperature of the melt falls below 240° C., the strand once again is observed to be inhomogeneous and indicative of degradation, probably because of excessive localized frictional heating of the at-that-temperature highly viscous polymer by the rotating extruder screw.

It is a particularly surprising aspect of the present invention that the combination of 6,6 nylon, with a melting point of 264° C., and spandex polymer, with a melting point of ca. 280° C., may be advantageously extruded with a melt temperature below 260° C. to form a homogeneous extrudate of good properties, while at temperature, in excess of 260° C., in which range one of ordinary skill in the art would predict would lie the acceptable extrusion condition, conspicuous degradation occurs.

In the most preferred embodiment of the invention, the melt temperature is in the range of 245–255° C.

The product of the process of the invention is a macroscopically homogeneous blend comprising a continuous nylon matrix having dispersed within it spherical particles of polyurethane polymer having a particle diameter of ca. 10 $\mu$m or less. When the melt temperature exceeds ca. 260° C., the amount of polyurethane polymer in the product is much reduced, presumably because of thermal degradation.

The extruded product of the invention may be employed to form shaped articles such as fibers, film, sheet, or molded shapes as are known in the art. Any process for forming such shapes as is known in the art may be employed, including compression molding, extrusion, melt spinning, and injection molding.

In a particularly preferred embodiment, pantyhose comprising a fiber blend of nylon 6,6 and spandex fiber are shredded into short fibers ca. 1–2 cm long. The fibers after shredding comprise a macroscopically inhomogeneous mixture because each individual fiber will be either nylon or polyurethane. Typical pantyhose comprises up to 20% by weight of spandex fiber. Sometimes the panty section will contain small amounts of other polymers such as cotton or olefin polymers.

The shredded pantyhose is then fed to a twin screw extruder wherein the individual fibers are melted and the molten polymer mixed and blended in the melt, the melt being maintained at a temperature in the range of 240–260° C. when measured as hereinabove described, followed by extrusion through an aperture, preferably a strand die, whereafter the strand is chopped into pellets.

The invention is further illustrated by the following specific embodiments. Prior to melt processing, all polymer in the examples following were dried at 90° C. for 48 hours in a Hotpack (Philadelphia, Pa.) vacuum oven subject to nitrogen purge.

EXAMPLES 1–3 AND COMPARATIVE EXAMPLES 1 AND 2

In these examples, a fibrous feed stock of ca. 81% nylon, 18% spandex, and 1% cotton was prepared by shredding pantyhose in a Model 604-360231 Conair cutter, Conair Cutters and Pellitizers, Franklin, Pa., into fibers ca. 1–2 cm in length and 11 or 25 $\mu$m in diameter. The fibrous composition was hand fed to a model 16TSE co-rotating 16 mm twin screw extruder having an L/D of 25:1 and incorporating two sets of mixing blocks along the length of the screws. The extruder was manufactured by Process Industry Specialists in Mixing, Lichfield, UK. The fibers were therein melted, mixed, and extruded in strand form through a die having a single aperture of 0.32 cm diameter circular cross-section.

COMPARATIVE EXAMPLE 1

Table 1 shows the extruder set-up.

TABLE 1

| | |
|---|---|
| Feed Zone (° C.) | 175 |
| Melt Zone (° C.) | 200–210 |
| Mixing Zone (° C.) | 215 |
| Compression Zone (° C.) | 225 |
| Die (° C.) | 230 |
| Screw Speed (RPM) | 100 |
| Torque (ft-lbs) | 75 |
| Melt (° C.) | 234 |
| Die Pressure (psi) | 360 |

The extruded strand broke frequently, contained extensive bubbles and blisters. Flow was irregular. Evolution of smoke and dripping were observed at the die.

EXAMPLE 1

Table 2 shows the extruder set-up

TABLE 2

| | |
|---|---|
| Feed Zone (° C.) | 175 |
| Melt Zone (° C.) | 200–210 |
| Mixing Zone (° C.) | 215 |
| Compression Zone (° C.) | 225 |
| Die (° C.) | 240 |
| Screw Speed (RPM) | 100 |
| Torque (ft-lbs) | 70 |
| Melt (° C.) | 240 |
| Die Pressure (psi) | 140 |

The extruded strand was examined visually and found to exhibit high uniformity of color at steady throughput. The strand was tough with few breaks and no observable bubbles or blisters. No smoking or dripping was observed.

EXAMPLE 2

Extrusion conditions are shown in Table 3.

TABLE 3

| | |
|---|---|
| Feed Zone (° C.) | 175 |
| Melt Zone (° C.) | 200–210 |
| Mixing Zone (° C.) | 215 |
| Compression Zone (° C.) | 225 |
| Die (° C.) | 250 |
| Screw Speed (RPM) | 100 |
| Torque (ft-lbs) | 50 |
| Melt (° C.) | 250 |
| Die Pressure (psi) | 77 |

Visual examination of the strand showed excellent steady flow without strand breaks, the strand being well-mixed and homogeneous in appearances. Very uniform, very smooth in appearance.

COMPARATIVE EXAMPLE 2

Extrusion conditions are shown in Table 4.

TABLE 4

| | |
|---|---|
| Feed Zone (° C.) | 175 |
| Melt Zone (° C.) | 200–210 |
| Mixing Zone (° C.) | 215 |
| Compression Zone (° C.) | 225 |
| Die (° C.) | 265 |
| Screw Speed (RPM) | 100 |
| Torque (ft-lbs) | 50 |
| Melt (° C.) | 265 |
| Die Pressure (psi) | 55 |

The resulting extrudate strand broke continually, throughput was unstable. The strand showed evidence of the presence of carbon black. Smoke was observed coming from the die.

EXAMPLE 3

Extrusion conditions are shown in Table 5.

TABLE 5

| | |
|---|---|
| Feed Zone (° C.) | 175 |
| Melt Zone (° C.) | 200–210 |
| Mixing Zone (° C.) | 215 |
| Compression Zone (° C.) | 225 |

TABLE 5-continued

| | |
|---|---|
| Die (° C.) | 250 |
| Screw Speed (RPM) | 100 |
| Torque (ft-lbs) | 45 |
| Melt (° C.) | 251 |
| Die Pressure (psi) | 50 |

The extrudate strand was homogeneous and uniform in appearance, and very smooth. Throughput was steady without breakage. No bubbles, blisters, smoking or dripping were observed.

EXAMPLES 4 TO 6

In the following examples, a model ZDS-K28II 26:1 L/D 28 mm co-rotating twin screw extruder having two kneading zones, manufactured by Werner and Pfleiderer, Ramsey, N.J., was employed to melt blend shredded pantyhose and extrude it through a single strand die with an aperture of 0.16 cm. Residence time in the extruder was estimated to be ca. 1.5–2 minutes. The pantyhose was shredded using a Foremost cutter, Model ASHD-2H, manufactured by Foremost, Fairfield N.J.

EXAMPLE 4

Extrusion conditions are shown in Table 6. The shredded pantyhose comprised ca. 95% nylon and 5% spandex fiber.

TABLE 6

| | |
|---|---|
| Feed Zone (° C.) | 84 |
| Melt Zone (° C.) | 211 |
| Mixing Zone (° C.) | 220 |
| Compression Zone (° C.) | 233 |
| Die (° C.) | 243 |
| Screw Speed (RPM) | 150 |
| Torque (amps) | 14.2 |
| Melt (° C.) | 255 |
| Die Pressure (psi) | 77 |

The resulting strand was uniform and homogeneous of good color, without brittleness. Throughput was steady.

EXAMPLE 5

The conditions of Example 4 were repeated. Extruder conditions are shown in Table 7.

TABLE 7

| | |
|---|---|
| Feed Zone (° C.) | 74 |
| Melt Zone (° C.) | 211 |
| Mixing Zone (° C.) | 220 |
| Compression Zone (° C.) | 233 |
| Die (° C.) | 242 |
| Screw Speed (RPM) | 148 |
| Torque (amps) | 11.5 |
| Melt (° C.) | 254 |
| Die Pressure (psi) | 74 |

The resulting strand was similar to that of Example 4: excellent uniformity and homogeneity, of good color. Steady throughput without breakage.

EXAMPLE 6

The feed material comprised 90% nylon and 10% spandex fiber. Extrusion conditions are shown in Table 8.

TABLE 8

| | |
|---|---|
| Feed Zone (° C.) | 60 |
| Melt Zone (° C.) | 211 |
| Mixing Zone (° C.) | 212 |
| Compression Zone (° C.) | 233 |
| Die (° C.) | 242 |
| Screw Speed (RPM) | 148 |
| Torque (amps) | 10.1 |
| Melt (° C.) | 254 |
| Die Pressure (psi) | 435 |

The resulting strand was of good color, uniform and homogeneous at steady throughput without breakage.

EXAMPLE 7

The strand of Example 5 was chopped into cylindrical pellets of ca. 1.6 mm diameter and 3.2 mm in height. The pellets were fed to a 35 ton injection molding machine model 221–7350 manufactured by Arburg, Lossburn, Germany and molded into 0.32 cm thick test bars appropriate to the standard test methods listed in Table 1. The melt temperature was ca. 250° C. and the mold temperature ca. 90° C. The molded bars were subject to standard tests. Results are shown in Table 9. Each datum in the Table 9 represents the average of three specimens. All tests are at room temperature.

TABLE 9

Physical Test Results

| Test Description | ASTM Method | Result |
|---|---|---|
| Punch Shear | D-732 | 6.07 Ksi |
| Izod Impact | D-256 | 0.688 ft-lbs/in. |
| Flexural Modulus | D-790 method I | 0.32 MPSI |
| Ultimate Stress | D-638 | 5.4 Ksi |
| Strain to Fail | D-638 | 14.5% |
| Tensile Modulus | D-638 | 279 Ksi |

EXAMPLE 8

Pellets produced according to Example 3 were added as a second feed to the feed throat of a model ZE40 Bersdortf twin screw extruder equipped with a close fitted Zenith gear booster pump and a filter pack with a 128 hole spinneret. The primary feed consisted of virgin nylon 6,6 of RV 25 according to ASTM D789. The primary feed was supplied at 100 lbs/hour while the second feed was 0.5 lbs/hour. Sodium phenyl phosphinate was added to the secondary feed. The filaments so produced were air quenched, twisted into yarns, and post-drawn over hot rolls to produce ya.mns of ca. 49 RV and linear densities of ca. 1200 grams/9000 m of yarn length.

What is claimed is:

1. A process for forming a polymer composition, the process comprising feeding a mixture of a thermoplastic polyamide and up to 20% by weight of a thermoplastic segmented polyurethane, said segmented polyurethane having soft segments and hard segments, said mixture formed by shredding pantyhose, to a melt mixing device, melting said mixture therein, and discharging the mixture so formed, the temperature of the melt being maintained in the range of 240–260° C. during the mixing process.

2. The process of claim 1 wherein the melt mixing device is a screw-type extruder.

3. The process of claim 2 wherein the extruder is a co-rotating twin screw extruder.

4. The process of claim 1 wherein the melt mixing device is a batch mixer.

5. The process of claim 1 wherein the temperature is maintained in the range 245–255° C.

6. The process of claim 1 wherein the polyamide is nylon 6,6.

7. The process of claim 6 wherein the segmented polyurethane has soft-segments comprising polyethers having number average molecular weight in the range of 1750–2250, the polyethers being selected from the group consisting of those derived from tetramethylene glycol, 3-methyl-1,5-pentane diol, tetrahydrofuran(THF), 3-methyltetrahydrofuran, and copolymers thereof, and the segmented polyurethane has hard segments derived from the reaction of an organic diisocyanate with a diamine chain extender, the chain extender being selected from the group consisting of ethylene diamine, 1,3-cylcohexane diamine, 1,4-cyclohexane diamine, 1,3-propylene diamine, 2-methylpentamethylene diamine, 1,2-propylene diamine, 1,2-diamino ethane, and mixtures thereof.

8. The process of claim 7 wherein the polyether is polytetramethylene ether glycol and the diisocyanate is methylene-bis-(4-phenylisocyanate).

9. The process of claim 6 wherein the polyurethane is of the composition poly(tetramethylene ether) glycol with a number average molecular weight of 1 800/methylene bis (4-phenyl isocyanate)/ethylene diamine mixed with 2-methyl-1,5-diaminopentane in a 90/10 molar ratio.

10. The process of claim I wherein the percent of thermoplastic segmented polyurethane present is 5% to 20%.

11. A process for fabricating a shaped article, the process comprising melting at a temperature of 240–260° C. a composition comprising a mixture of thermoplastic polyamide and up to 20% by weight of a thermoplastic segmented polyurethane, the segmented polyurethane having soft segments and hard segments, said mixture formed by shredding pantyhose; forming the molten composition into a definite shape; and, cooling the shaped melt to form the fabricated shape.

12. The process of claim 10 wherein the polyamide is nylon 6,6 and the polyurethane is of the composition poly (tetramethylene ether) glycol with a number average molecular weight of 1800/methylene bis (4-phenyl isocyanate)/ethylene diamine mixed with 2-methyl-1,5-diaminopentane in a 90/10 molar ratio.

* * * * *